No. 656,085. Patented Aug. 14, 1900.
G. C. BLICKENSDERFER.
TYPE WRITING MACHINE.
(Application filed Apr. 26, 1900.)

(No Model.) 7 Sheets—Sheet 4.

Witnesses
John N. Grace
T. F. Kehoe

Inventor
George C. Blickensderfer
By Philipp Phelps Sanger
Attorneys

No. 656,085. Patented Aug. 14, 1900.
G. C. BLICKENSDERFER.
TYPE WRITING MACHINE.
(Application filed Apr. 26, 1900.)
(No Model.) 7 Sheets—Sheet 5.

Witnesses
John S. Graves.
T. F. Kehoe

Inventor
George C. Blickensderfer
By Philipp, Phelps & Sanger
Attorneys

No. 656,085. Patented Aug. 14, 1900.
G. C. BLICKENSDERFER.
TYPE WRITING MACHINE.
(Application filed Apr. 26, 1900.)

(No Model.) 7 Sheets—Sheet 6.

Witnesses
John T. Graves
T. F. Schol

Inventor
George C. Blickensderfer
By Philipp Phelps Sanger
Attorneys

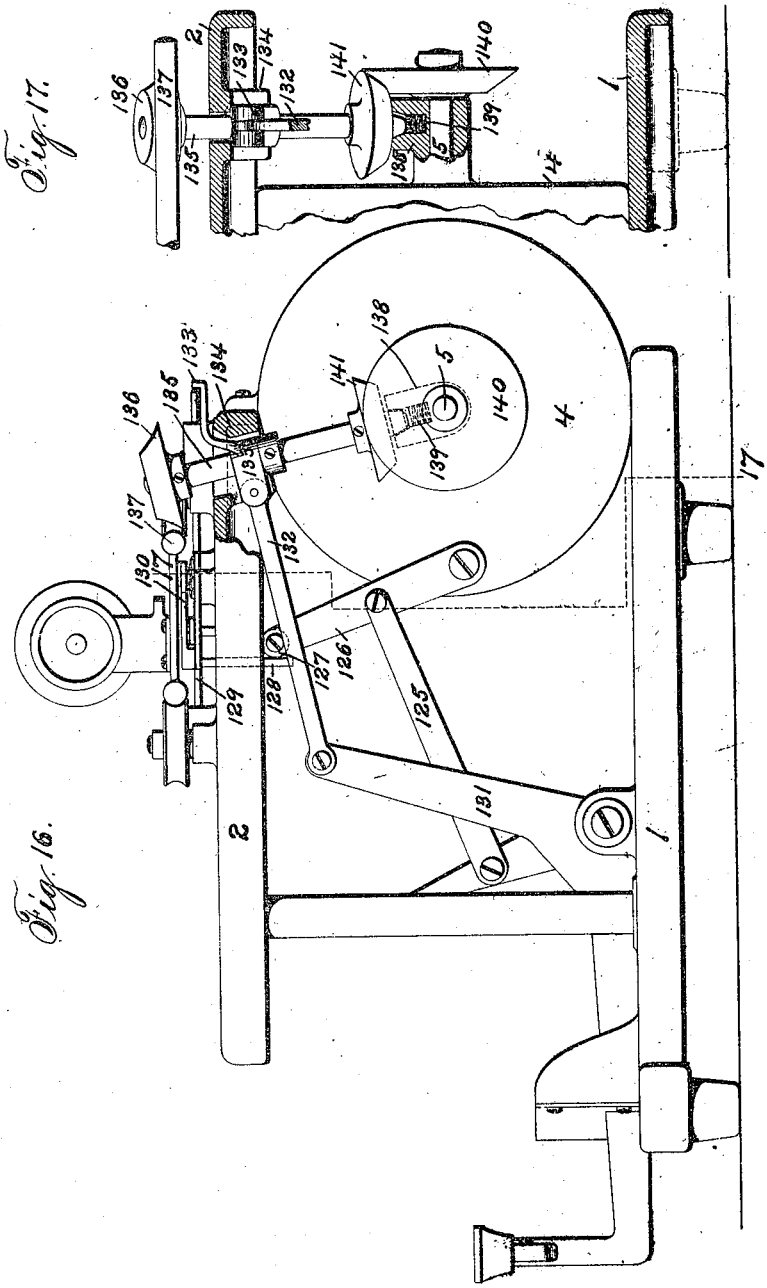

UNITED STATES PATENT OFFICE.

GEORGE C. BLICKENSDERFER, OF STAMFORD, CONNECTICUT.

TYPE-WRITING MACHINE.

SPECIFICATION forming part of Letters Patent No. 656,085, dated August 14, 1900.

Application filed April 26, 1900. Serial No. 14,452. (No model.)

*To all whom it may concern:*

Be it known that I, GEORGE C. BLICKENSDERFER, a citizen of the United States, residing at Stamford, county of Fairfield, and State of Connecticut, have invented certain new and useful Improvements in Type-Writing Machines, fully described and represented in the following specification and the accompanying drawings, forming a part of the same.

This invention relates to certain improvements in type-writing machines.

The invention has for one of its objects to produce an improved type-writing machine which shall embody a simple, compact, and efficient power mechanism by which the type mechanism is operated.

A further object of the invention is to produce an improved type-writing machine in which the several parts shall be so arranged that the machine is capable of being operated either by power or by hand.

A further object of the invention is to produce an improved type-writing machine in which the carriage shall be returned by a simple and efficient power mechanism.

With these and other objects in view the invention consists in certain constructions and in certain parts, improvements, and combinations, as will be hereinafter fully described and then more particularly pointed out in the claims hereunto appended.

Figure 1:
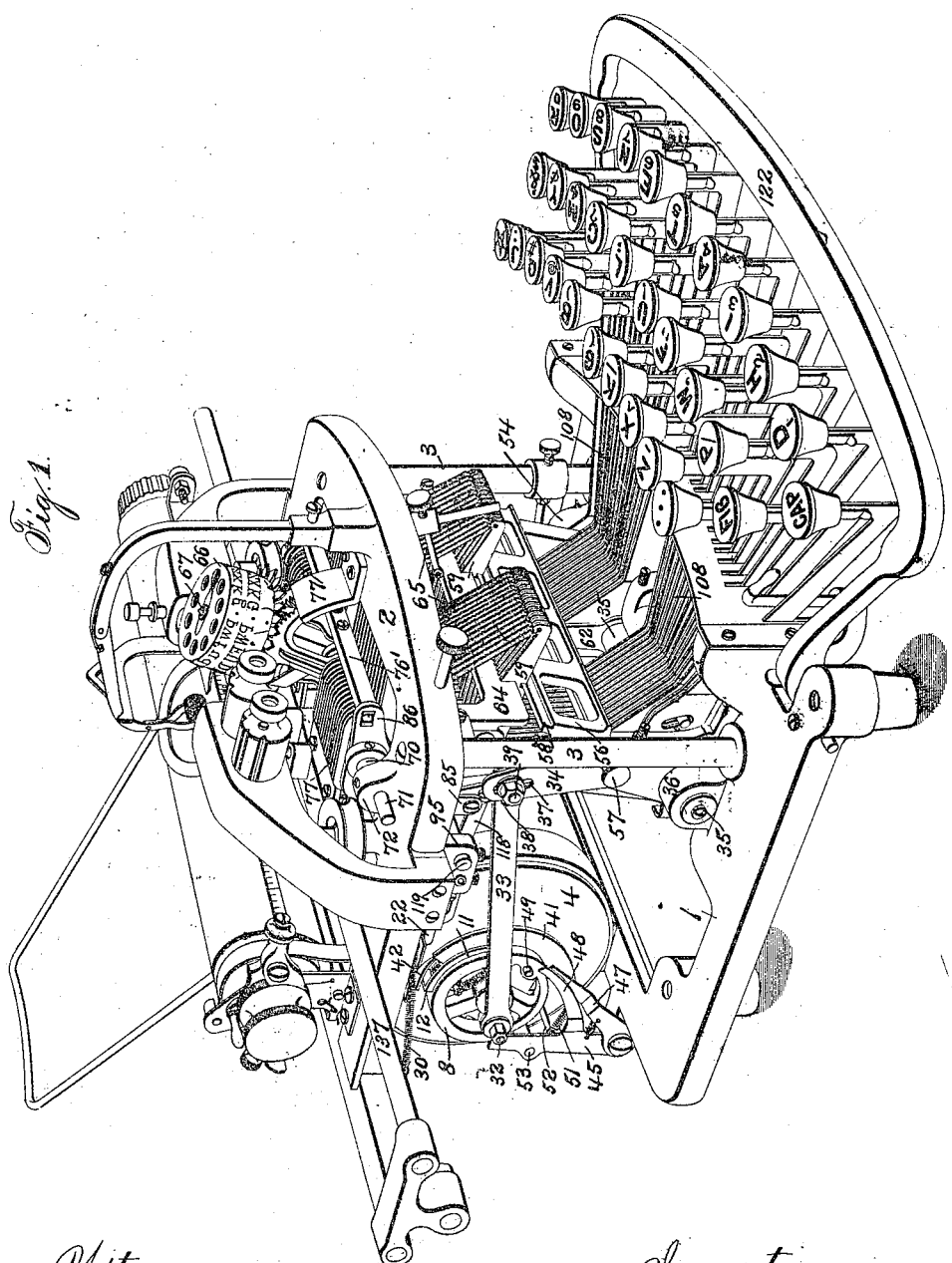
Figure 2:
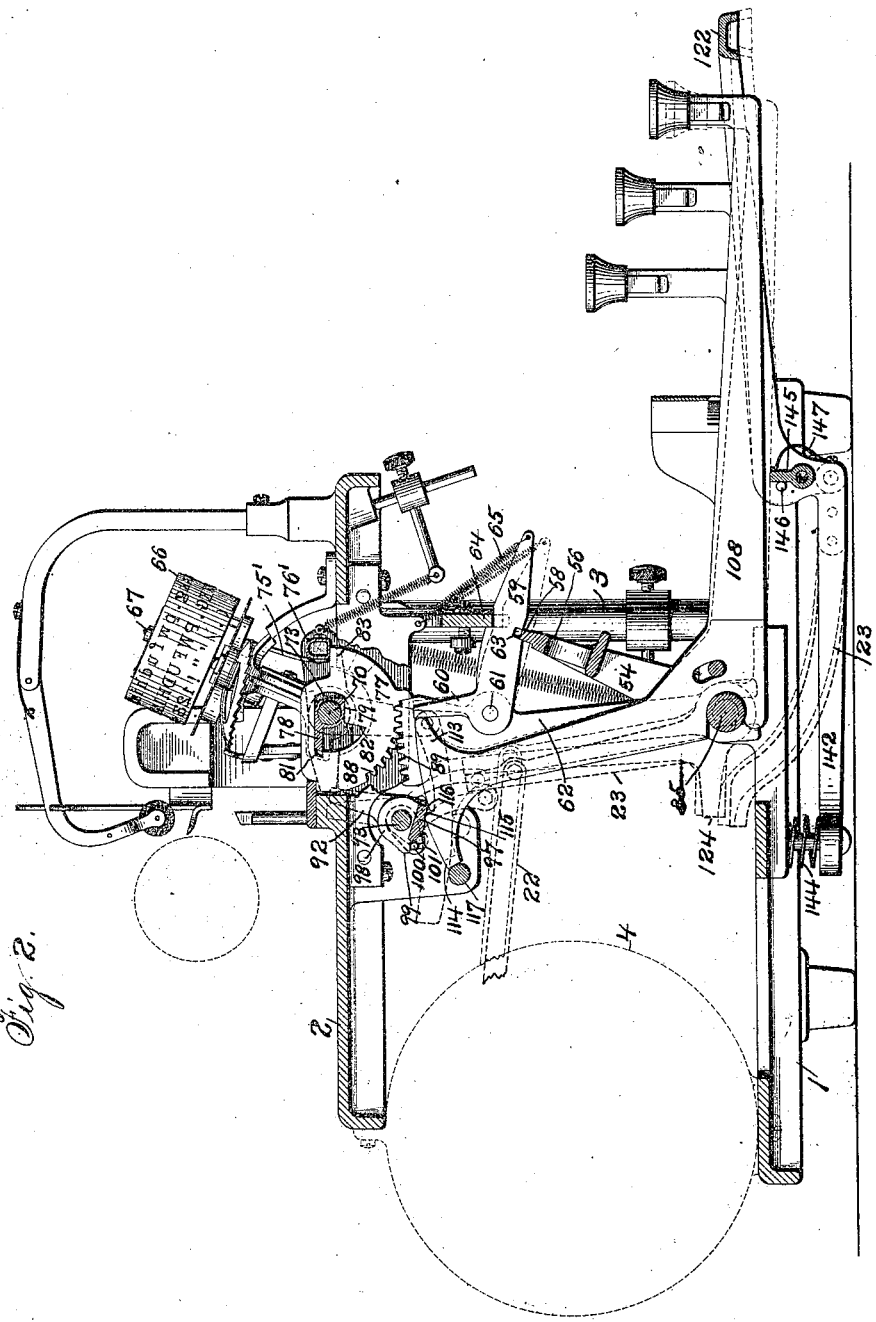
Figure 3:
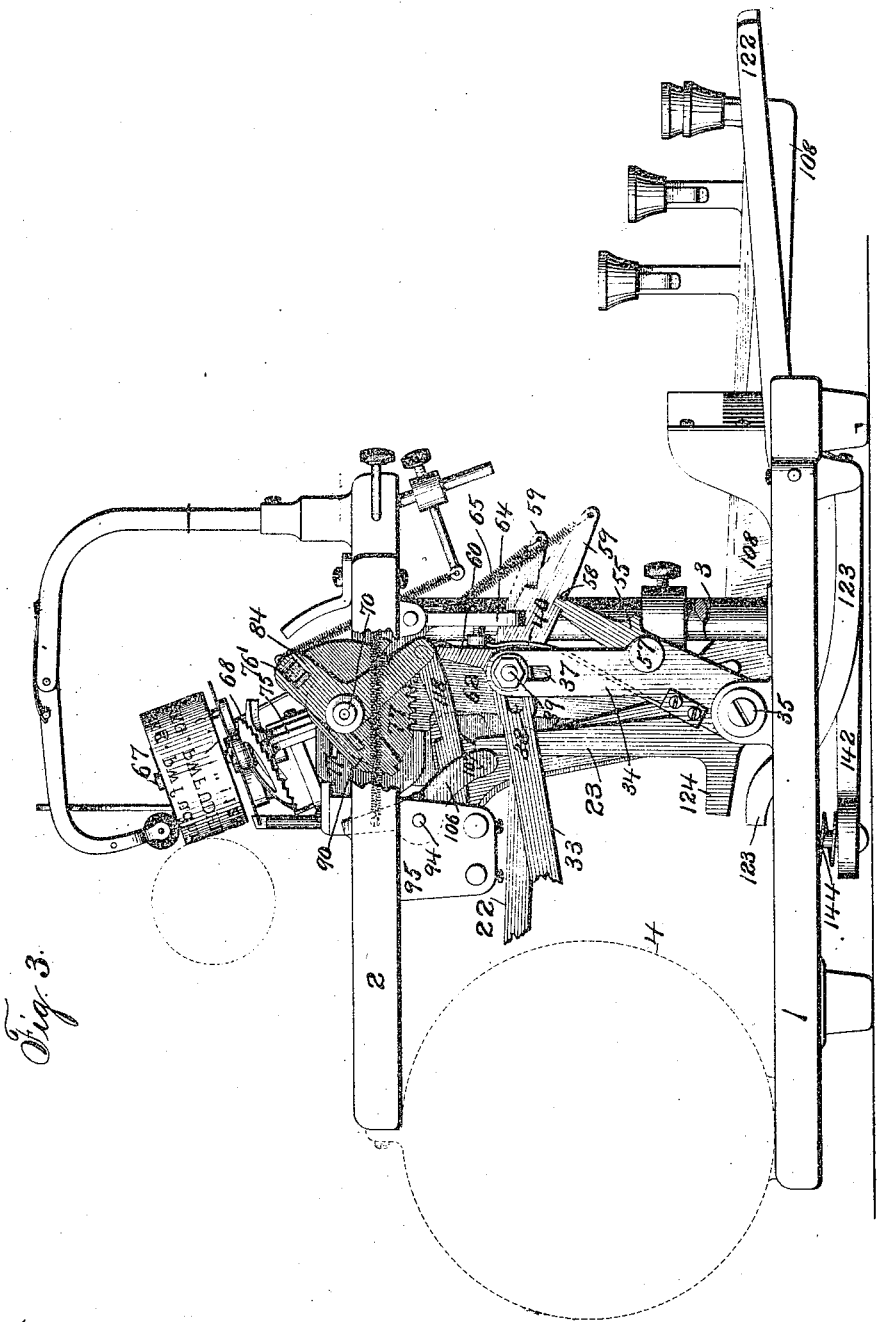
Figure 4:
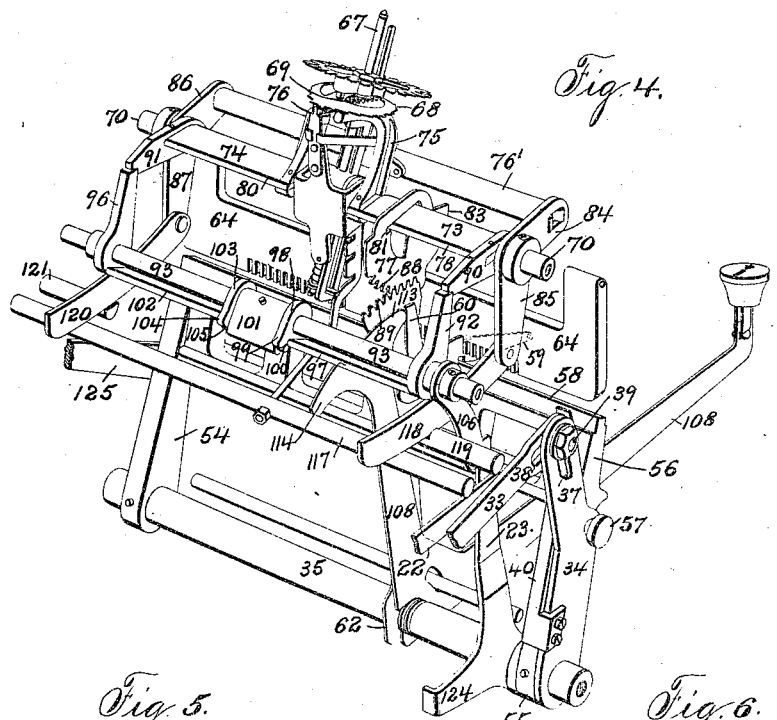
Figures 5, 6:
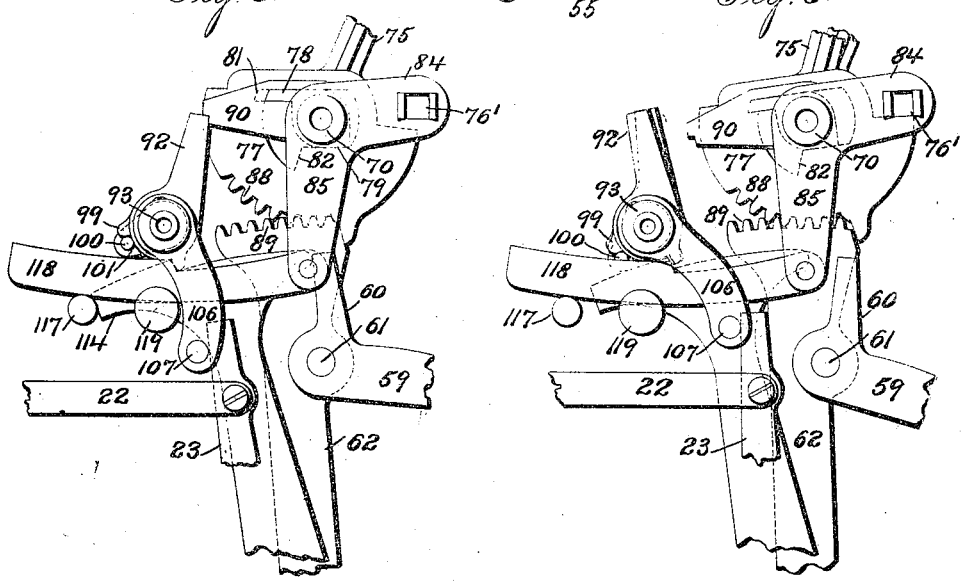
Figure 7:
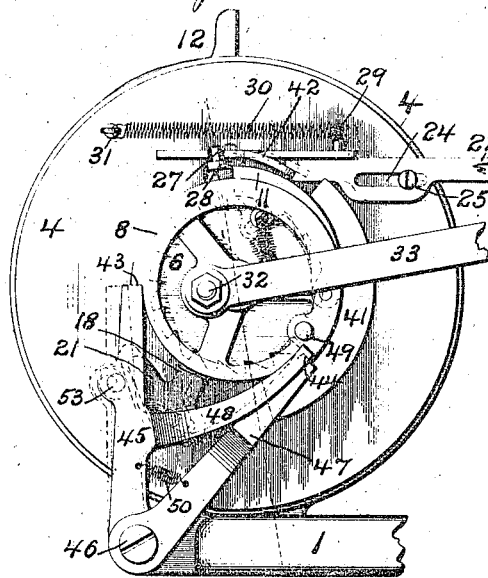
Figure 8:
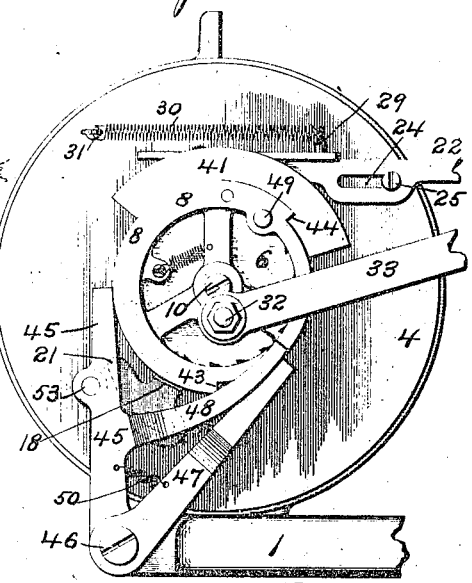
Figure 9:
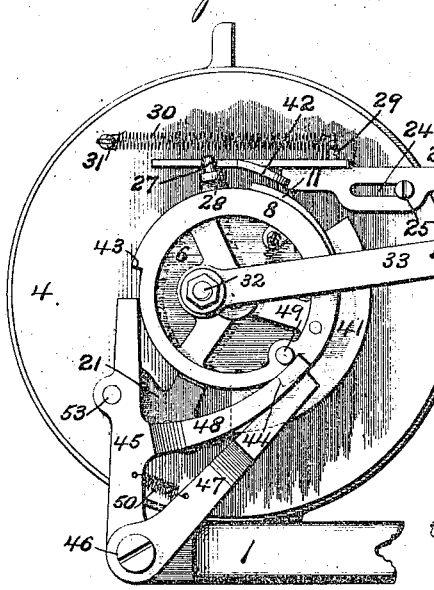
Figure 10:
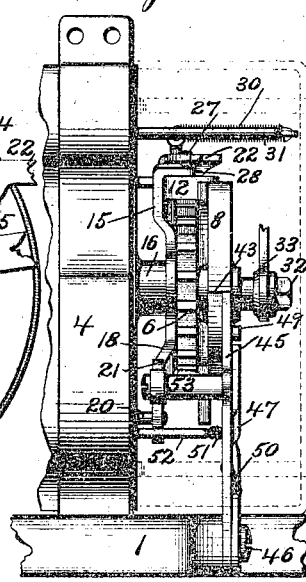
Figure 11:
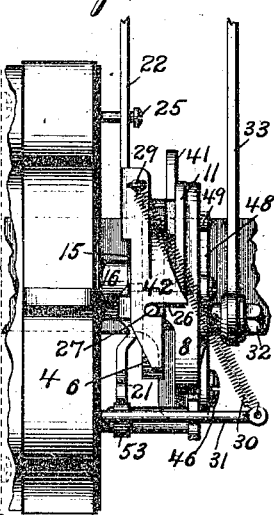
Figure 12:
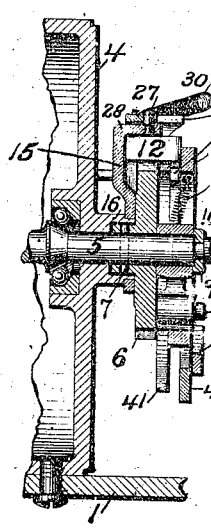
Figure 13:
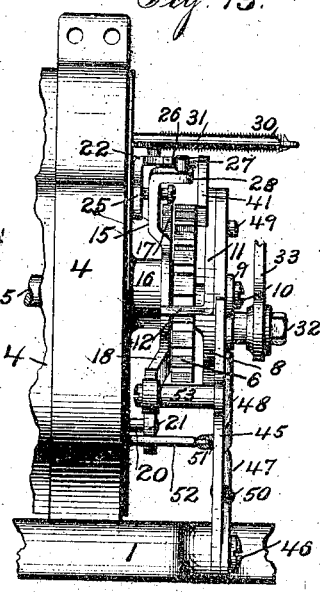
Figure 14:
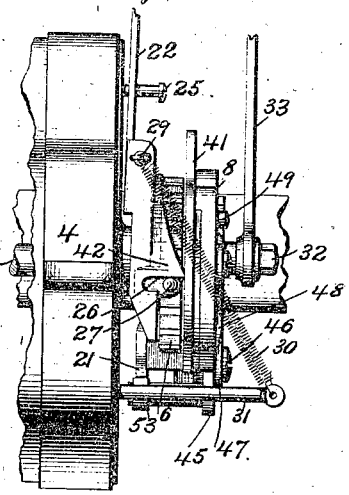
Figure 15:
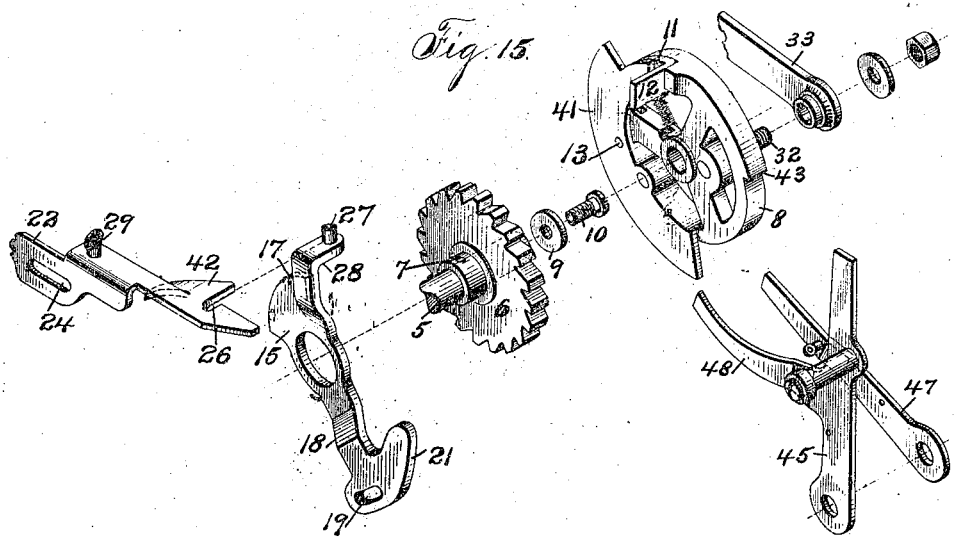

In the accompanying drawings, which form a part of this specification, and in which like characters of reference indicate the same parts, Figure 1 is a perspective view of a type-writing machine embodying the invention. Fig. 2 is a sectional side elevation of the construction shown in Fig. 1. Fig. 3 is a view similar to Fig. 2, but showing the parts in a different position. Fig. 4 is a detail perspective view illustrating the connections between the key-levers and the operating-tumblers and also the construction of the segment-locking mechanism. Figs. 5 and 6 are detail views. Fig. 7 is a side view, on an enlarged scale, of the clutch mechanism. Fig. 8 is a view similar to Fig. 7, showing the parts in a different position. Fig. 9 is a view similar to Figs. 7 and 8, but showing the parts in still another position. Fig. 10 is an elevation of the construction shown in Fig. 7 looking at it from the left of the observer, the parts being shown in the position in which they are shown in Fig. 7. Fig. 11 is a plan view of the construction shown in Fig. 7. Fig. 12 is a sectional elevation on the line 12 12 of Fig. 7. Fig. 13 is a view similar to Fig. 10, but showing the crank and ratchet wheels locked together by the locking-pawl. Fig. 14 is a view similar to Fig. 11, but showing the parts in a different position. Fig. 15 is a diagrammatic view illustrating several parts of the clutch mechanism. Fig. 16 is a side elevation of the carriage-returning mechanism. Fig. 17 is a section on the line 17 17 of Fig. 16.

Referring to the drawings, the frame, which may be of any usual or ordinary construction, consists of a casting 1, which forms the base of the frame, and a casting 2, which forms the top of the frame, the casting 2 being connected to or supported on the casting 1 by means of pillars 3 or in any other suitable or desired manner.

Connected to the frame in any suitable manner is the case which contains the motor. This case is shown as consisting of two heads or drums 4, formed to provide suitable bearings in which the main power-shaft 5 is mounted. Any suitable form of motor may be used to drive the main power-shaft 5. Preferably, however, an electric motor will be used; but since this motor forms no part of the invention it is not illustrated.

In this machine the power mechanism in the preferred form of the construction is constantly driven, and an actuating mechanism is provided through which the type mechanism is operated, the actuating mechanism being connected to and disconnected from the power mechanism for each operation of the type mechanism.

The power mechanism in the form of the machine shown embodies the constantly-running power-shaft 5 before referred to, and the actuating mechanism is connected to and disconnected from the shaft by a clutch. Any suitable form of clutch may be used between the power-shaft and the actuating mechanism. In the construction shown the power-shaft 5 is provided with a ratchet-wheel 6, which is secured thereto in any suitable or desired manner—as, for instance, by a pin 7, (see Fig. 12)—so as to constantly rotate with the shaft. Loosely mounted in any suitable manner on the power-shaft is a driving-wheel 8, which is preferably a crank-wheel, said wheel being shown as held in position by a washer 9, which is or may be secured to the end of the shaft by means of a suitable screw, as 10.

The driving crank-wheel 8 is designed to be secured to and disengaged from the constantly-rotating ratchet-wheel 6 for each operation of the machine. While this may be effected in any suitable manner, in the construction shown, which embodies a preferred form, the driving-wheel 8 carries a pawl 11, having an angular end 12, said pawl being pivoted on a pin 13. (See Fig. 15.) The under side of the pawl is provided with an eye, to which is secured a spring 14, which tends to draw the pawl down into a position in which its angular end 12, which extends over the ratchet-wheel 6, engages the teeth of said wheel.

Suitable controlling means are provided to prevent the engagement of the pawl with the ratchet-wheel except when such engagement is desired. In the construction shown this is effected by a controller 15, which is shown as loosely mounted on a boss 16, which extends from one of the heads 4 of the motor-case. This controller 15 is provided with a cam 17, which in the normal position of the parts lies underneath the angular end 12 of the pawl 11 and raises it out of engagement with the teeth of the ratchet-wheel. When, however, the controller is swung on the boss, the cam 17 passes out from under the angular end of the pawl and allows it to engage the teeth of the ratchet-wheel. The controller 15 in the construction shown is provided with an extension 18, said extension having a slot 19, which takes over a pin 20, extending from one of the heads 4 of the motor-case, the purpose of this construction being to limit the controller in its movement, though this guiding construction may be omitted, if desired. The extension 18 is further provided with a cam projection 21, the purpose of which will be hereinafter stated.

The controller 15 is operated from the keys of the machine through suitable connections, which may be varied widely in construction. In the machine shown a slide-bar 22 is provided for this purpose, said bar being connected at one end to a lever 23, which is thrown into operation when a key is operated in a manner to be hereinafter described. Near its operating end the slide-bar 22 is provided with a slot 24, which takes over a pin 25, extending from one of the heads 4 of the motor-case, said pin serving to guide the bar in its movement.

In the preferred form of the construction the slide-bar 22 and the controller 15 are preferably detachably connected. To this end the operating end of the bar is provided (see Fig. 15) with an open-ended slot 26, which takes over an upwardly-extending pin 27, said pin being mounted on an angular arm 28, secured to the controller 15. The slide is held forward—that is, in the position in which the cam 17 is in position to hold the pawl 11 out of engagement with the teeth of the wheel 6—in any suitable manner. In the construction shown the slide is provided with a pin 29, to which is connected a spring 30, the other end of the spring being connected to a pin 31, extending from one of the heads 4 of the motor-case.

With the construction so far described it will be seen that when the lever 23 is operated, through the connections to be hereinafter described, from any one of the keys the slide-bar 22 is moved rearwardly against the stress of the spring 30. This movement of the slide-bar rocks the controller 15 on the boss 16 and moves the cam 17 out from under the angular end 12 of the pawl 11. The pawl under the influence of its spring immediately engages the teeth of the ratchet-wheel 6, and the driving crank and ratchet wheels are locked together and rotate together.

The power from the driving-wheel may be transmitted to the actuating mechanism in any suitable manner. In the machine shown the crank-wheel 8 is provided with a crank-stud 32, to which is connected a connecting-rod 33, the other end of the rod being connected to an arm 34, which is loosely mounted on a shaft 35, journaled in bearings 36 on the lower casting 1. While the arm 34 is loosely mounted on the shaft, it is arranged to be rigidly connected to parts carried by the shaft in a manner which will be hereinafter described, so that a movement of the arm rocks the shaft.

The throw of the shaft produced by the driving crank-wheel is preferably made adjustable. While any suitable adjustable connection may be used to effect this result, in the construction shown the arm 34 is provided with a slot 37, which extends lengthwise of the arm. The rod 33 is provided with a slot 38, which extends lengthwise thereof, as shown, and the rod and arm are connected by means of a bolt 39 or in any other suitable manner. It will be seen that by adjusting the bolt up or down in the slot 37 the point of connection between the rod and the arm is varied with reference to the center about which the arm moves, and the throw of the arm is consequently varied.

Means are preferably provided to prevent any breakage in the machine due to any binding or locking of the mechanism operated through the arm 34. While any suitable means may be used for this purpose, a slip or friction connection is preferably formed between the connecting-rod 33 and the arm 34, and to this end a stiff spring 40 is provided, said spring being carried on the arm 34 and bearing against the end of the rod 33, this construction being clearly shown in Fig. 3. As the crank-wheel rotates, therefore, if the arm 34 or any of the mechanism operated by it is locked or binds the rod 33 will have a lengthwise movement with respect to the arm 34, said movement being permitted by the slot 38. The crank-wheel therefore may be rotated without moving the arm 34 in case of any locking or binding of the machine; but the spring 40 is made stiff enough so that under ordinary circumstances the rotation of the crank-wheel will operate through the connecting-rod to rock the arm.

The machine is designed so that one revolution of the crank-wheel operates to effect a printing movement of the type mechanism, after which the crank-wheel is disconnected from the ratchet-wheel. This is effected in the present machine by the return movement of the controller 15, which after being operated by the slide 22 swings back into its original position. When this construction is used, it is important that the controller return to its original position before the crank-wheel completes its revolution, for otherwise the wheel might run far enough so as to carry the end 12 of the pawl 11 over the cam 17, and if this occurred the pawl would again engage and the machine would repeat. In order to insure the prompt return of the controller, it is preferably arranged to be disconnected from the slide-bar 22 immediately after it has been moved thereby. While any suitable devices may be used to effect this disconnection, in the construction shown the crank-wheel 8 is provided with a projection or flange 41, which coöperates with a cam 42 on the forward end of the slide. Immediately after the crank-wheel has been connected to the ratchet-wheel on the forward movement of the slide and the wheel begins its rotation the projection 41 strikes the cam 42 and moves the slide sidewise a sufficient amount to disconnect the operating end of the slide from the pin 27, said pin passing out of the open end of the slot 26. As soon as this occurs the controller 15 is free to assume its normal position and does so, this movement being due to several causes, among which is the fact that it is overweighted and normally tends to swing into a forward position and also the fact that the rotation of the wheel 6, against which it lies, tends to carry it forward. Before, therefore, the wheel 8 can complete its rotation the controller 15 has resumed its normal position, this position being such that the cam 17 will disengage the pawl 11 as the crank-wheel completes its rotation.

Devices which may be varied in construction are preferably provided to insure the accurate stopping of the crank-wheel 8 when it has completed its revolution. To this end the wheel is provided with two notches 43 44. The notch 43 is arranged to be engaged by the end of a stop-arm 45, which is pivoted on a screw 46, secured to the base 1 of the frame, said arm preventing when in engagement with the notch any forward rotation of the wheel. Another stop-arm 47 is provided, the end of which engages the notch 44 and prevents any backward rotation of the wheel. In order to positively insure that the stop-arm 45 is properly positioned to engage the notch 43, it is preferably provided with a curved extension 48, which is arranged to be struck in the revolution of the wheel 8 by a pin 49, carried on said wheel. As the wheel rotates in the direction of the arrow (see Figs. 7 to 9) it will be seen that the pin 49 will positively engage the extension 48 and throw the stop-arm 45 into a position where it must engage the notch 43. The arms 45 and 47 are preferably connected by a light spring 50, the purpose of which is to prevent any rebound of the stop-arm 45. The arm 47 is held up against the wheel 8 by means of a spring 51, which is connected to the arm and to a pin 52, extending from one of the heads of the motor-case.

When the controller 15 is operated to move the cam 17 out from under the end 12 of the pawl 11, it is necessary at the same time to release the wheel 8 from the stop-arm 45. While the means for accomplishing this may be varied, in the construction shown the arm 45 is provided with a pin 53, said pin projecting into the path of the cam projection 21, which, as before stated, is mounted on the end of the extension 18 of the controller 15. The rocking of the controller, therefore, by the means before described not only allows the pawl 11 to snap in and lock the crank-wheel 8 to the ratchet-wheel 6, but it also moves the stop-arm 45 out of the way, and thus unlocks the wheel, so as to permit it to turn.

When the crank-wheel has been clutched to the power-shaft in the manner hereinbefore described, it serves to drive the actuating mechanism, which through proper connections causes the type to be impressed upon the paper. This actuating mechanism may be widely varied in construction. In the construction shown the shaft 35 has keyed thereto a pair of arms 54 55, said arms being connected by an actuating bar or bail 56, which may be, and in the construction shown is, formed integral with the arms. The arm 34, which it will be remembered has been described as the arm to which the connecting-rod 33 is secured, is connected to one of the arms—viz., the arm 55—in any suitable manner. Preferably, however, it will be detachably connected, as by a set-screw 57.

Suitable means which may be varied in construction are provided for locking the bar or bail 56 at proper times to the actuating mechanism for a particular type. In the construction shown the upper edge of the actuating bar or bail is provided with a reduced edge 58, which underlies the arms 59 of a series of locking bell-crank levers 59 60, one for each key-lever. These locking bell-crank levers in the construction shown are pivoted at 61 to actuating-levers 62, which are mounted on the shaft 35. Each of the bell-crank levers has its arm 59 provided with a notch 63, the notches being so arranged that when the bar or bail 56 is in its backward or normal position the notches will be in position to engage the reduced edge of the bail. It is obvious, therefore, that if any one of the bell-cranks is turned on its pivot its notch will engage the upper reduced edge of the bail 56 and the bell-crank lever, and the actuating-levers 62 will be locked to and move with the bail as it is moved. While the locking-levers may be disconnected from the bar or bail 56 in any suitable manner, the parts are preferably so arranged that as the actuating-bar completes its operating movement the springs 65 turn the bell-crank locking-levers on their pivots and disengage them from the bar.

A guide is preferably provided to insure the accurate movement of the bell-crank levers, said guide, as shown, consisting of a comb 64, between the teeth of which the levers lie, said levers being normally held out of engagement with the bail or bar 56 by means of suitable springs 65. The teeth of the comb-guide are preferably made long enough so that when the levers are thrown down into engagement with the bail they will not pass out from between the teeth.

The machine which has been selected to illustrate the invention is generally of the well-known Blickensderfer type, in which the printing characters are carried by a wheel and the wheel is rotated to bring into position the proper character to be impressed upon the paper. In the present machine the type-wheel 66 is mounted on a vertical shaft 67, said shaft being provided with a stopping-ratchet 68 and a pinion 69, by which it is rotated, the shaft being supported by a rock-shaft 70. This shaft 70 is shown as carried by cone-pins 71, which are mounted in bearings 72 on the upper casting 2 of the frame. The shaft 70 supports a two-part operating mechanism, said mechanism including sleeves 73 and 74, the sleeve 73, having connected to it the sector-carrying arm 75 and the sleeve 74 having connected to it the sector-carrying arm 76, both sectors being in engagement with the pinion 69. It will be understood that a part of the keys operate upon the sector 75 through the sleeve 73 and suitable connections and the remainder of the keys upon the sector 76 through the sleeve 74 and suitable connections. When either of the sectors is rocked, the other is held stationary by means of a suitable locking mechanism, and the moving sector causes the pinion 69 to roll upon the stationary sector until the stopping-ratchet is engaged by a locking-pawl 75', which is shown as carried on a bail 76'. After the stop-pawl engages the stopping-ratchet both sectors and the type-wheel move together until the type strikes the paper.

In the present machine the rotation of the sleeves 73 74 is effected to rotate the type-wheel, and the stop-pawl 75' is thrown into operation to stop the rotation of said wheel by means of graduated tumblers 77, one of these tumblers being provided for each key-lever and a part of the tumblers being arranged on the sleeve 73 and the remainder on the sleeve 74. Suitable means are provided to lock each tumbler to its carrying-sleeve, so that the sleeve may be operated by the tumbler. While this may be effected in various ways, in the construction shown each tumbler is made movable with respect to its carrying-sleeve, and, as shown in Figs. 2 and 4 to 6, the sleeve 73 is provided with a projection 78 and a flattened side 79, and the sleeve 74 is provided with a similar projection 80 and its under side is similarly flattened. Each of the tumblers is provided with an opening which is somewhat wider than the sleeve and its projection and with a notch 81, these notches being arranged to engage the projections 78 and 80 of the sleeves. Each tumbler is further provided with a flattened side 82, which sides coöperate with the flattened sides of the sleeves. The tumblers are further provided with graduated projections 83, said projections taking under the bail 76', which carries the stop-pawl 75', this bail, it may be here remarked, being carried in arms 84 86 of two bell-crank levers 84 85 and 86 87, which are loosely mounted on the rock-shaft 70.

In the present machine the tumblers are operated from the levers 62. While the construction by which this is accomplished may be varied, each of the tumblers is shown as provided with a set of segment-teeth 88, and the levers 62 are provided with similar teeth 89, with which the teeth 88 mesh. It will be apparent that when a particular segment-lever 62 is rocked its teeth 89 will mesh with the teeth 88 of the tumbler which coöperates with it. As the teeth come into mesh the tumbler will first be caused to slide with respect to the sleeve 73 or 74, as the case may be, until the notch on the tumbler engages with the projection 78 or 80. When this occurs, the tumbler is locked to the sleeve and any further movement of the lever 62 causes the sleeve to rotate on the shaft 70 and to operate the segment attached to the sleeve. Owing, however, to the peculiar size and shape of the openings in the tumblers, only that tumbler will be moved which is locked to the sleeve, the sleeve turning idly in the openings of the other tumblers. This construction furthermore operates as a safety-lock, for as soon as one of the sleeves begins its movement no other tumblers can be caused to engage with it until it has been returned to its normal position. As has been before stated, one of the sectors remains stationary while the other is moving to properly position the type-wheel. In order to insure that the sector which is not moving to position the type-wheel be positively held stationary, suitable locking devices are provided. While these devices may be varied in construction, in the machine shown the sleeve 73 is provided with a projecting arm 90, said arm having a notched end, (see Fig. 4,) and the sleeve 74 is provided with a similar notched arm 91.

The notched arm 90 engages a projecting finger 92, which is loosely mounted on a shaft 93, the said shaft being suitably supported by cone-pins 94, which project through ears 95, secured to the under side of the upper casting 2 of the frame. The arm 91 is similarly engaged by a projecting finger 96, also loosely mounted on the shaft 93.

Suitable releasing devices are provided for the locking devices just described, and these releasing devices will preferably include an independent releasing device for each locking device and a releasing device which is common to both of them and by which therefore either of the locking devices may be unlocked. These releasing devices may be constructed in various ways. In the machine shown the finger 92 has connected to it an extension 97, the other end of the extension having secured to it a collar 98, which is loosely mounted on the shaft 93. This collar 98 has a projecting end 99, which takes over a pin 100 on a block 101, secured to the shaft 93 by means of a pin or in any other suitable manner. Similarly the finger 96 has connected to it an extension 102, to the other end of which is connected a collar 103, said collar being loosely mounted on the shaft 93 and having a projecting end 104, which takes over a pin 105, projecting from the block 101. With this construction it is obvious that by turning the extension 97 the arm 92 will be rocked out from under the locking-arm 90, and at the same time, since the block 101 is secured to the shaft, the end 99 of the collar 98, acting upon the pin 100, will rock the shaft 93, and this movement of the shaft will take place without rocking the arm 96 and releasing the arm 91 of the other sector. Similarly by moving the extension 102 the finger 96 will be rocked out from under the arm 91, and at the same time the end 104 of the collar 103, acting on the pin 105, will rock the shaft 93, this operation taking place without disturbing the locking position of the finger 92. Either locking device may therefore be released without affecting the other.

Immediately after either of the locking devices is released the power mechanism should be thrown into operation to effect the operation of the type mechanism. While this may be accomplished in various ways, in the machine shown the shaft 93 has fastened to it an arm 106, said arm being provided with a pin 107, which takes behind the end of the lever 23, said lever, it being remembered, being the lever to which the slide-bar 22 is connected. When, therefore, either the locking-finger 92 or 96 is moved to release its corresponding sector, the arm 106 causes the movement of the lever 23, which in turn moves the slide-bar to operate the clutch mechanism.

The machine is provided with the usual bank of key-levers, which may be of any suitable or desired form. In the construction shown these key-levers effect the operation of the independent releasing devices for the sector-sleeves and also the operation of the locking devices by which the actuating mechanism is locked to the operating-levers. Widely-different constructions may be utilized to effect these functions. In the construction shown, however, the key-levers consist of bent levers 108, formed with enlarged heads, said heads having projections 113 114 and notches 115. The extension 97 is provided with a projection 116, which engages the notches of a part of the key-levers, and the extension 102 is provided with a similar projection which engages the notches of the remainder of the key-levers. The projections 113 of the key-levers lie behind the arms 60 of the bell-cranks 59 60, which, as before stated, operate to lock the arms 62 to the actuating bar or bail 56. The projections 114 of the key-levers strike against a back-stop rod 117, which is supported in the ears 95 and which limits the movement of the levers. When a key-lever is depressed, therefore, its projection 113 first strikes the arm 60 of the corresponding locking bell-crank lever 59 60 and causes the notch 63 in the arm 59 of said crank to engage the bail 56. At the same time the notch 115 of the key-lever, by reason of its engagement with the projection 116, rocks the extension 97 or 102, as the case may be, and releases the locking-finger of the sector for the side on which the key is struck. At the same time the shaft 93 is rocked, which through the arm 106 operates the lever 23 and throws in the clutch of the power mechanism. The movement of the actuating-bar now rocks forward the lever 62 corresponding to the key which is struck, turns the tumbler 77 with which it is in engagement, and rocks the corresponding sector to position the type-wheel.

In the Blickensderfer type of machine after the wheel has been positioned and the stop-pawl 75', which is carried by the bail 76', has been thrown in, thus locking the wheel, it is necessary that both sectors move with the wheel in order that the positioned type may make its impression upon the paper. It will be remembered, however, that only one sector has thus far been unlocked by its independent releasing device. The releasing device which is common to both sectors is therefore now brought into operation to release the sector which remains locked after the movement by which the released sector positions the type-wheel is completed. While this common releasing device may be varied widely in form, in the construction shown there is connected to the arm 85 of the bell-crank 84 85 a sliding notched pawl 118, said pawl being supported on a pin 119, which projects inwardly from one of the ears 95, before referred to. Similarly the arm 87 of the bell-crank 86 87 has connected to it a sliding notched pawl 120, said pawl being supported on a pin 121, which projects inwardly from the other ear 95. The notches and the pawls 118 120 are arranged to engage the projections 116 on the under side of the extensions 97 102. As the bail is moved, therefore, by one of the graduated tumblers to throw in the stop-pawl the sliding pawls 118 120 will be moved forward and will engage the extension 97 or 102, as the case may be, which corresponds with the sector which was stationary while the type-wheel was being positioned. By this engagement either the finger 92 or 96, as the case may be, will be rocked and the sector which has remained stationary will be released and permitted to move forward with the type-wheel and the other sector.

The machine is provided with a spacing mechanism which may be of any desired construction. As shown, it consists of a bar 122, which is pivoted in the casting 1 of the frame. The spacing-bar is provided with an arm 123, which is rigidly secured thereto and has an upwardly-bent end which takes under a projection 124, which extends from the lever 23, to which the slide-bar 22 is connected. When, therefore, the spacing-bar is touched, the upwardly-projecting end of the arm 123, acting on the projection 124, rocks the lever 23 and throws in the clutch. The spacing-bar has also connected to it an arm 142, which bears against a returning-spring 144, surrounding a stud which depends from the under side of the casting 1. In order to limit the downward movement of the keys, a suitable stop 145 is provided, said stop being preferably pivoted in the sides of the spacing-bar and being held up against a stop 146 by means of a spring 147. The purpose of pivoting the stop 145 is to permit it to be turned down out of the way when the machine is operated by hand, as will be hereinafter described.

One of the arms 54, which carries the operating bail or bar 56, has connected to it a link 125, (see Figs. 4 and 16,) said link being in turn connected to a lever 126, which is pivoted to any suitable part of the machine—as for instance, to one of the heads of the motor-case. This lever carries a roll 127, which bears against a pin 128, which is connected to a slide 129, said slide serving to operate a releasing-pawl 130, the construction of the releasing-pawl being similar to that ordinarily used in this type of machines.

After a line is written the carriage may be returned by hand or in any suitable manner; but preferably it will be returned by power. Various means may be employed for this purpose; but in the construction shown a special carriage-returning lever 131 is provided, (see Fig. 16,) said lever being connected by means of a link 132 to a block 133, which slides in diagonal guides 134 in the upper casting 2. The block 133 has a perforation through it and in this perforation is located a shaft 135, which carries on one end a beveled wheel 136, which wheel may, if desired, be covered with any suitable friction material or may be constructed from such material. This wheel 136 takes under one of the carriage-rails 137. The other end of the shaft 135 is stepped in a bearing 138, formed in one of the heads which carries the bearing for the main shaft 5. The bearing 138 has a spring 139 located therein, which normally presses the shaft upward. The main shaft 5 carries on its end a bevel friction-wheel 140, which may be engaged by a similar wheel 141, carried on the shaft 135. Normally, however, the wheels 141 and 140 are out of engagement. While the carriage-operating pawl may be released in any suitable manner in order that the carriage may be returned, the block 133 preferably has connected to it an angular bracket 133', the upturned end of which takes behind the slide 129. When it is desired to return the carriage, the carriage-returning lever is depressed by means of its key and the block 133 is caused to slide in its diagonal guides 134, forcing the wheel 136 under the carriage-rail 137 and also forcing the friction-wheel 141 against the wheel 140, which being carried by the main shaft is of course constantly rotating and moving the slide 129 to operate the pawl 130. The shaft 135 will be rotated and the wheel 136 will cause the carriage to be returned.

The general operation of the machine is as follows: When the operator depresses any given key, its key-lever 108 is rocked about the shaft 35. As soon as this takes place the projection 113 on the head of the key-lever swings the correspondingly-locking bell-crank 59 60 about its pivot 61, thus locking the segment-lever 62 to the bail 56, the edge of the bail being engaged by the notch 63 in the arm 59 of the bell-crank. Simultaneously with this operation, supposing one of the levers which operates on the extension 97 has been struck, the notch 115 in the head of the lever engages the projection 116 and rocks the extension 97, which in turn causes the locking-finger 92 to swing out from under the arm 90 on the sector-sleeve 73. Simultaneously with this releasing operation the projection 99 on the collar 98, which is connected to the extension 97, strikes the pin 100 and rocks the shaft 93, thus causing the pin 107 on the arm 106 to strike the upper end of the lever 23, rocking this lever about its pivot. The lever 23 in its forward movement operates the slide-bar 22 and swings the controller 15, thus causing the cam 17 to move out from under the angular end 12 of the pawl 11, permitting the pawl to engage one of the notches of the ratchet-wheel 6, which, it will be remembered, is fast on the power-shaft 5. This locks the driving crank-wheel 8 to the power-shaft 5. Simultaneously with this operation the cam projection 21, operating on the pin 53 of the stop-arm 45, swings the stop-arm out of engagement with the notch 43 of the wheel 8, so that the wheel is free to rotate. As soon as the wheel begins its rotation the projection 41, operating on the cam 42, disconnects the slide from the pin 27, permitting the controller to resume its normal position. The rotation of the wheel 8 rocks the arm 34, which, it will be remembered, is secured to one of the arms 55 by means of the set-screw 57, so that as the wheel revolves the bar 56 is rocked, carrying with it a segment-lever 62, which is in engagement with a tumbler 77. As the lever 62 begins to move the tumbler first slides on the sleeve 73, and this movement continues until the notch 81 of the tumbler engages the projection 78 of the sleeve. The tumbler 77 now rocks the sleeve 73, operating the sector which is attached thereto and rotating the type-wheel to position the type. As the type comes into position the bail 76' is raised by the graduated end 83 of the tumbler and the stop-pawl 75' is thrown into engagement with the stopping-ratchet 68. As the bail moves up, the pawl 120, which is attached to the arm 87 of one of the bell-cranks 86 87 of the bail, releases the other sector and the two sectors and the type-wheel now move forward together and the type makes an impression upon the paper. As the bail or bar 56 comes into its extreme backward position its upper reduced edge 58 passes out of the notch 63 of the locking bell-crank, said bell-crank being returned by its spring 65. The bar 56 is returned by a spring 142, which returns the sector to its proper position. In the meantime the crank-wheel 8 has completed its revolution and the cam 17 has disconnected the pawl 11 from the ratchet-wheel 6, the stop-arm 45 having been thrown over in the meantime by contact of the pin 49 with the curved extension 48.

While the machine is primarily intended for use as a power-machine, it may be operated by hand when desired should an emergency arise—such, for instance, as a failure of the power. In the present machine in order to operate it by hand the thumb-screw 57 is loosened, thus disconnecting the arm 34 from the arm 55. This disconnects the power mechanism from the actuating-bar 56. The stop 145 is turned down against the stress of its spring 147, thus permitting a much greater downward movement of the key-levers. When the machine is thus arranged, if one of the key-levers be struck its projecting end 113 will actuate the arm 60 of its corresponding locking bell-crank 59 60, throwing said arm into engagement with the actuating-bar 56. If now the downward movement of the lever is continued, its end 113 will still continue to act upon the bell-crank and will push it forward, carrying forward with it the segment-lever 62 and the actuating-bar, although in this instance the actuating-bar makes an idle movement, except in so far as it operates the spacing mechanism. The movement of the segment-lever 62 will effect the movement of the corresponding tumbler, and all the subsequent operations of the machine will be effected in the same manner as though the moving force for the segment-lever 62 were the actuating-bail and not the key-lever.

The invention has been shown in connection with a type-writing machine of the wheel type. It is to be understood, however, that it is not to be limited to machines of this type, as it is capable of being applied, with suitable changes in construction, to other types of type-writing machines. It is also to be understood that the construction by which the several features of the invention are carried into effect may be varied within wide limits. The invention is not therefore to be limited to the specific details of construction which have been hereinbefore described.

What is claimed is—

1. The combination with a constantly-running power mechanism, of a type mechanism, a normally-inoperative actuating mechanism, means for intermittently connecting the actuating mechanism and the type mechanism, a bank of keys, and means controlled by each of the keys for causing the power mechanism to operate the actuating mechanism, substantially as described.

2. The combination with a constantly-running power mechanism, of a type mechanism, a normally-inoperative actuating mechanism therefor, a bank of keys, means for positively connecting the actuating mechanism to the type mechanism, said means being constructed to be operated by each of the keys, and means for causing the power mechanism to operate the actuating mechanism, substantially as described.

3. The combination with a constantly-running power mechanism, of a type mechanism, a normally-inoperative actuating mechanism, a bank of keys, means for positively connecting the actuating mechanism to the type mechanism, and means for causing the power mechanism to operate the actuating mechanism, both sets of means being constructed to be operated by each of the keys, substantially as described.

4. The combination with a constantly-running power mechanism, of a type mechanism comprising a series of separate characters, a normally-inoperative actuating mechanism connections between the actuating mechanism and the type mechanism whereby the actuating mechanism is caused to operate each of said characters, a clutch mechanism for connecting the actuating mechanism to the power mechanism, a bank of keys, and connections between each key and the clutch mechanism, substantially as described.

5. The combination with a constantly-running power mechanism, of a type mechanism, a normally-inoperative actuating mechanism therefor, a clutch mechanism for connecting the operating mechanism to the power mechanism, connections including locking devices between the type mechanism and the actuating mechanism, a bank of keys, connections between each key and the clutch mechanism, and means whereby each key operates the locking devices, substantially as described.

6. The combination with a constantly-running power mechanism, of a type mechanism, a normally-inoperative actuating mechanism therefor, a clutch mechanism for connecting the actuating mechanism to the power mechanism, connections including locking devices between the type mechanism and the actuating mechanism, locking mechanism for preventing the operation of the type mechanism, releasing devices for the locking mechanism, a bank of keys, connections between each key and the clutch mechanism, means whereby each key releases the locking mechanism and throws the locking devices into operation, substantially as described.

7. The combination with a constantly-running power mechanism, of a type mechanism, a normally-inoperative actuating member, a clutch mechanism for connecting said member to the power mechanism, connections including locking devices between said member and the type mechanism, a bank of keys, connections between each key and the clutch mechanism, and means whereby each key operates said locking devices, substantially as described.

8. The combination with a constantly-running power mechanism, of a type mechanism, a normally-inoperative actuating-bar, connections including a clutch between the bar and the power mechanism, means for giving the bar a lateral movement, means whereby said bar operates the type mechanism, a bank of keys, and connections between each key and the clutch, substantially as described.

9. The combination with a constantly-running power mechanism, of a type mechanism, a normally-stationary actuating-bar, connections including a clutch between the bar and the power mechanism, means for giving the bar a lateral movement, means whereby said bar operates the type mechanism, a bank of keys, and connections between each key and the clutch, substantially as described.

10. The combination with a constantly-running power mechanism, of a type mechanism, a normally-inoperative actuating-bar, connections including a clutch between the bar and the power mechanism, connections including locking devices between the type mechanism and the bar, a bank of keys, connections between each key and the clutch, and means whereby each key operates the locking devices, substantially as described.

11. The combination with a constantly-running power mechanism, of a type mechanism, a normally-stationary actuating-bar, connections including a clutch between the bar and the power mechanism, connections including locking devices between the type mechanism and the bar, a bank of keys, connections between each key and the clutch, and means whereby each key operates the locking devices, substantially as described.

12. The combination with a constantly-running power mechanism, of a type mechanism, a normally-inoperative actuating-bar, connections including a clutch between the bar and the power mechanism, connections including locking devices between the type mechanism and the bar, locking mechanism for preventing the operation of the type mechanism, releasing devices for said locking mechanism, a bank of keys, connections between each key and the clutch, means whereby each key operates the locking devices, and means whereby each key operates the releasing devices for the locking mechanism, substantially as described.

13. The combination with a constantly-running power mechanism, of a type mechanism, a normally-stationary actuating-bar, connections including a clutch between the bar and the power mechanism, connections including locking devices between the type mechanism and the bar, locking mechanism for preventing the operation of the type mechanism, releasing devices for said locking mechanism, a bank of keys, connections between each key and the clutch, means whereby each key operates the locking devices, and means whereby each key operates the releasing devices for the locking mechanism, substantially as described.

14. The combination with a type mechanism comprising a series of separate characters, of a constantly-running power mechanism, a bank of keys, means common to and controlled by each of the keys for intermittently establishing a connection between the type mechanism and the power mechanism whereby the power mechanism operates each character, and means for interrupting said connections after each printing movement whereby the operation of a key produces a single printing movement only, substantially as described.

15. The combination with a type mechanism comprising a series of separate characters, of a constantly-running power mechanism, a driving-wheel, devices whereby said driving-wheel may be secured to the power mechanism, a controller for said devices, means whereby the driving-wheel operates each character of the type mechanism, a bank of keys, and means whereby each key operates the controller, substantially as described.

16. The combination with a type mechanism, of a constantly-running power mechanism, a driving-wheel, stopping devices for the wheel, devices whereby said wheel may be secured to the power mechanism, a controller for said devices, said controller also operating the stopping devices, means whereby the driving-wheel operates the type mechanism, a bank of keys, and means whereby each key operates the controller, substantially as described.

17. The combination with a constantly-running power mechanism, of a type mechanism, a driving-wheel, a movable actuating member, connections between said member and the driving-wheel, connections including locking devices between the type mechanism and the actuating member, devices for connecting the driving-wheel to the power mechanism, a controller for said devices, a bank of keys, means whereby each key operates the controller, and means whereby each key operates the locking devices, substantially as described.

18. The combination with a constantly-running power mechanism, of a driving-wheel, a type mechanism, connections between the driving-wheel and the type mechanism, devices for securing the driving-wheel to the power mechanism, a controller for said devices, a slide-bar for operating the controller, a bank of keys, and means whereby each key operates the slide-bar, substantially as described.

19. The combination with a constantly-running power mechanism, of a type mechanism, a driving-wheel, connections between said wheel and the type mechanism, devices for connecting the wheel to the power mechanism, a controller for said devices, a bank of keys, means whereby each key operates the controller, and means for disconnecting the wheel from the power mechanism after each operation of the type mechanism, substantially as described.

20. The combination with a constantly-running power mechanism, of a type mechanism, a driving-wheel, a clutch between the wheel and the power mechanism, a controller for said clutch, a bank of keys, means whereby each key operates the controller to permit the clutch to secure the wheel to the power mechanism, means operated by the controller for disconnecting the wheel from the power mechanism after each operation of the type mechanism, and connections between the wheel and the type mechanism, substantially as described.

21. The combination with a constantly-running power mechanism, of a type mechanism, a driving-wheel, connections between the type mechanism and the wheel, a clutch between the wheel and the power mechanism, a controller for said clutch normally positioned to render the clutch inoperative, a bank of keys, means whereby each key operates the controller, and means whereby the controller is caused to assume its normal position after it has been operated so as to again disconnect the clutch, substantially as described.

22. The combination with a constantly-running power mechanism, of a type mechanism, a driving-wheel, connections between the driving-wheel and the type mechanism, a clutch between the driving-wheel and the power mechanism, a controller normally positioned to render the clutch inoperative, a slide-bar for operating the controller, a bank of keys, means whereby each key operates the slide-bar, and means for disconnecting the slide-bar from the controller after it has been operated so that the controller may resume its normal position, substantially as described.

23. In a type-writing mechanism, the combination with a constantly-running power mechanism, of a driving-wheel, a clutch for securing the driving-wheel to the power mechanism, a controller normally rendering the clutch inoperative, a stopping mechanism for the driving-wheel, means for operating the controller to throw the clutch into operation, means whereby the controller operates the stopping devices to release the wheel, and means moving with the wheel for throwing the stopping devices into operation, substantially as described.

24. In a type-writing mechanism, the combination with a constantly-running power mechanism, of a driving-wheel, a clutch between the driving-wheel and the power mechanism, a rocking controller normally rendering the clutch inoperative, a stopping mechanism for the wheel, connections between the controller and the stopping mechanism whereby the stopping mechanism is caused to release the wheel as the controller moves into inoperative position, means whereby the controller assumes its operative position after the clutch has been thrown into operation so as to again throw out the clutch, means carried by the wheel for throwing the stopping mechanism into operative position as the controller throws out the clutch, substantially as described.

25. In a type-writing mechanism, the combination with a constantly-running power mechanism, of a driving-wheel, a clutch between the power mechanism and the wheel, a controller normally rendering the clutch inoperative, a slide-bar for operating the controller, a stopping mechanism, means whereby the controller throws the stopping mechanism out of operation as the clutch connections become operative, means carried by the wheel for disconnecting the slide-bar from the controller, whereby the controller is allowed to assume its normal position, and means carried by the wheel for throwing the stopping mechanism into operation, substantially as described.

26. In a type-writing mechanism, the combination with a constantly-running power mechanism, of a driving-wheel, means for connecting the wheel to and disconnecting it from the power mechanism, a stop-arm engaging the wheel, said arm having a curved extension, means for throwing the stop-arm out of operation as the wheel is connected to the power mechanism, a pin mounted on the wheel and engaging the extension of the stop-arm for throwing the same into operation as the wheel is disconnected from the power mechanism, substantially as described.

27. In a type-writing mechanism, the combination with a constantly-running power mechanism, of a driving-wheel, a clutch between the shaft and the wheel, a controller normally rendering the clutch inoperative, a slide-bar for operating the controller, a projection on the bar, and a coöperating projection on the wheel for disconnecting the bar from the controller after the controller has been operated, substantially as described.

28. In a type-writing mechanism, the combination with a constantly-running power mechanism, of a driving-wheel, a clutch between the power mechanism and the wheel, a rocking controller normally rendering the clutch inoperative, a slide-bar for operating the controller, a stop-arm having a curved extension, means whereby the controller throws the stop-arm out of operation as it is moved to render the clutch operative, means carried by the wheel for disconnecting the slide-bar from the controller, whereby the controller is allowed to assume its normal position, and a pin carried by the wheel and engaging the extension of the stop-arm for throwing the same into operation as the wheel is disconnected from the power mechanism, substantially as described.

29. The combination with a constantly-running power mechanism, of a type mechanism, a driving-wheel, connections between the driving-wheel and the type mechanism, a clutch for securing the driving-wheel to the power mechanism, a controller normally holding the clutch out of operation, stopping devices for the driving-wheel, a bank of keys, means whereby each of the keys operates the controller to throw the clutch into operation, means whereby the controller operates the stopping devices to release the wheel, and means moving with the wheel for throwing the stopping devices into operation, substantially as described.

30. The combination with a constantly-running power mechanism, of a type mechanism, a driving-wheel, a clutch between the driving-wheel and the power mechanism, a rocking controller normally rendering the clutch inoperative, a bank of keys, means whereby each key operates the controller, a stopping mechanism for the wheel, connections between the controller and the stopping mechanism whereby the stopping mechanism is caused to release the wheel as the controller moves into inoperative position, means carried by the wheel for disconnecting the controller from its operating connections, whereby the controller is allowed to resume its normal position, and means carried by the wheel for throwing the stopping mechanism into operative position, substantially as described.

31. The combination with a constantly-running power mechanism, of a type mechanism, a driving-wheel, a clutch between the driving-wheel and the power mechanism, a rocking controller normally rendering the clutch inoperative, a slide-bar for operating the controller, a bank of keys, means whereby each key operates the slide-bar, a stopping mechanism, means whereby the controller throws the stopping mechanism out of operation as the clutch becomes operative, means carried by the wheel for disconnecting the slide-bar from the controller, whereby the controller is allowed to assume its normal position, and means carried by the wheel for throwing the stopping mechanism into operation, substantially as described.

32. The combination with a constantly-running power-shaft, of two wheels mounted thereon, one of which is a driving-wheel loose on the shaft and the other of which is secured thereto, pawl-and-ratchet connections between the wheels, a rocking controller having a cam which normally holds the pawl out of operation, a slide-bar for operating the controller, a bank of keys, means whereby each key operates the slide-bar, a type mechanism, and connections between the type mechanism and the driving-wheel, substantially as described.

33. The combination with a constantly-running power-shaft, of two wheels mounted thereon one of which is a driving-wheel loose on the shaft and the other of which is secured to the shaft, pawl-and-ratchet connections between the wheels, a rocking controller having a cam which normally holds the pawl out of operation, a slide-bar for operating the controller, a bank of keys, means whereby each key operates the slide-bar, a stop-arm, means whereby the controller operates the stop-arm as it is rocked so that its cam passes from beneath the pawl, means carried by the driving-wheel for disconnecting the slide-bar from the controller, and means also carried by the driving-wheel for throwing the stop-arm into operation as the controller throws out the pawl, substantially as described.

34. The combination with a constantly-running power-shaft, of two wheels mounted thereon one of which is a driving-wheel loose on the shaft and the other of which is secured to the shaft, pawl-and-ratchet connections between the wheels, a rocking controller having a cam which normally holds the pawl out of operation, a slide-bar for operating the controller, a bank of keys, means whereby each key operates the slide-bar, a stop-arm, means whereby the controller operates the stop-arm as it is rocked so that its cam passes from beneath the pawl, means carried by the driving-wheel for disconnecting the slide-bar from the controller, means also carried by the driving-wheel for throwing the stop-arm into operation as the controller throws out the pawl, a type mechanism and connections between the type mechanism and the driving-wheel, substantially as described.

35. The combination with a type mechanism, of a normally-inoperative power-driven actuating mechanism, a bank of keys, mechanical means controlled by each of the keys for throwing the actuating mechanism into operation, and means independent of the means for throwing the actuating mechanism into operation whereby each of the keys causes the actuating mechanism to operate the type mechanism, substantially as described.

36. The combination with a type mechanism of a normally-inoperative power-driven actuating mechanism, a bank of keys, means controlled by each of the keys for throwing the actuating mechanism into operation, key-controlled means independent of the means for throwing the actuating mechanism into operation for causing the actuating mechanism to operate the type mechanism and means for throwing the actuating mechanism out of operation after the actuation of the type mechanism, substantially as described.

37. The combination with a type mechanism, of a normally-inoperative actuating mechanism, connections including locking devices for securing the actuating mechanism to the type mechanism, a bank of keys, mechanical means controlled by each of the keys for throwing the actuating mechanism into operation, and means whereby each of the keys operates the locking devices, substantially as described.

38. The combination with a type mechanism, of a normally-inoperative actuating-bar, connections including locking-levers for connecting the type mechanism to the bar, a bank of keys for operating the locking-levers, and mechanical means for throwing the actuating-bar into operation, substantially as described.

39. The combination with a type mechanism, of a series of operating members therefor, an actuating member, a series of locking-levers serving to connect the operating members to the actuating member, a bank of keys, means whereby the keys operate the locking-levers, and mechanical means for throwing the actuating member into operation, substantially as described.

40. The combination with a type mechanism, of a series of operating members therefor, an actuating member, a series of locking-levers serving to connect the operating members to the actuating member, a bank of keys, means whereby the keys operate the locking-levers, and mechanical means controlled by the keys for throwing the actuating member into operation, substantially as described.

41. The combination with a type mechanism, of an actuating-bar, a series of operating-levers, a series of locking-levers serving to connect the operating-levers to the actuating-bar, a bank of keys for operating the locking-levers, and mechanical means for operating the actuating-bar, substantially as described.

42. The combination with a type mechanism, of an actuating-bar, a series of operating-levers, a series of locking-levers serving to connect the operating-levers to the actuating-bar, a bank of keys for operating the locking-levers, and mechanical means controlled by the keys for operating the actuating-bar, substantially as described.

43. The combination with an actuating-bar, of a type mechanism, a series of operating-levers therefor, a series of notched locking-levers serving to connect the operating-levers to the actuating-bar, a series of key-levers for operating the notched locking-levers, a power mechanism for driving the actuating-bar, and means for connecting the actuating-bar to the power mechanism, substantially as described.

44. The combination with an actuating-bar, of a type mechanism, of series of operating-levers therefor, a series of notched locking-levers serving to connect the operating-levers to the actuating-bar, a series of key-levers for operating the notched locking-levers, a power mechanism for driving the actuating-bar, means controlled by the key-levers for connecting the actuating-bar to the power mechanism, substantially as described.

45. The combination with a type mechanism, of a power mechanism, an actuating-bar, connections including a clutch between the actuating-bar and the power mechanism, a series of operating-levers, a series of notched locking-levers serving to connect the operating-levers to the actuating-bar, a series of key-levers for operating the notched locking-levers, and means controlled by the key-levers for throwing the clutch of the power mechanism into operation, substantially as described.

46. The combination with a type mechanism, of an actuating-bar, a series of operating members, a series of spring-held locking-levers, a guide for positioning the locking-levers, a series of key-levers arranged to operate the locking-levers, and a power mechanism for operating the actuating-bar, substantially as described.

47. The combination with a type mechanism, of an actuating-bar, a power mechanism, connections including a clutch between the power mechanism and the actuating-bar, a series of operating-levers, a series of spring-held locking-levers operating to connect the operating-levers to the actuating-bar, a series of key-levers arranged to operate the locking-levers, and means controlling each key-lever for throwing the clutch into operation, substantially as described.

48. The combination with a type mechanism, of an actuating-bar, a power mechanism, connections including a clutch between the power mechanism and the actuating-bar, a series of operating-levers, a series of spring-held locking-levers operating to connect the operating-levers to the actuating-bar, a guide for the locking-levers, a series of key-levers arranged to operate the locking-levers, and means controlled by each key-lever for throwing the clutch into operation, substantially as described.

49. The combination with a type-carrier, of a support, a series of tumblers movable with respect to the support, operating connections between the support and the type-carrier, means for locking each tumbler to the support, and an operating device for each tumbler, substantially as described.

50. The combination with a type-carrier, of a sleeve, a series of tumblers movable with respect to the sleeve, operating connections between the sleeve and the type-carrier, means for locking each tumbler to the sleeve, and an operating device for each tumbler, substantially as described.

51. The combination with a type-carrier, of a support, operating connections between the support and the type-carrier, a series of tumblers movable with respect to the support, means for locking any one of the tumblers to the support, means for moving the tumbler so locked and the support, and means for preventing any other tumbler from engaging the support until the support has returned to its normal position, substantially as described.

52. The combination with a type-carrier, of a sleeve, operating connections between the sleeve and the type-carrier, a series of tumblers movable with respect to the sleeve, means for locking any one of the tumblers to the sleeve, means for moving the tumbler so locked and the sleeve, and means for preventing any other tumbler from engaging the sleeve until the sleeve has returned to its normal position, substantially as described.

53. The combination with a type-carrier, of a support, operating connections between the support and the type-carrier, a series of tumblers movable with respect to the support, means brought into operation by the movement of each tumbler with respect to the support for locking that tumbler to the support, and an operating device for each tumbler, substantially as described.

54. The combination with a type-carrier, of a sleeve, operating connections between the sleeve and the type carrier, a series of tumblers movable with respect to the sleeve, means brought into operation by the movement of each tumbler with respect to the sleeve for locking that tumbler to the sleeve, and an operating device for each tumbler, substantially as described.

55. The combination with a type-carrier, of a support having a projection, a series of notched tumblers movable with respect to the support, and an operating member for each tumbler, said member operating to move the tumbler so that its notch engages the projection on the support and then to move the support and the tumbler, substantially as described.

56. The combination with a type-carrier, of a sleeve having a projection, a series of notched tumblers movable with respect to the sleeve, and an operating member for each tumbler, said member operating to move the tumbler so that its notch engages the projection on the sleeve and then to move the sleeve and the tumbler substantially as described.

57. The combination with a type-carrier, of a support having a projection, a series of notched tumblers movable with respect to the support, segment-teeth on each tumbler, and a segment-lever for each tumbler, each segment-lever operating to move its tumbler so that the notch in the tumbler engages the projection on the support and then to move the support and the tumbler, substantially as described.

58. The combination with a type-carrier, of a support, a series of tumblers movable with respect to the support, operating connections between the support and the type mechanism, means for locking each tumbler to the support, an operating device for each tumbler, an actuating mechanism, means for locking each operating device to the actuating mechanism, and a power mechanism for operating the actuating mechanism, substantially as described.

59. The combination with a type-carrier, of a support, a series of tumblers movable with respect to the support, operating connections between the support and the type-carrier, means for locking each tumbler to the support, an operating device for each tumbler, an actuating mechanism, a locking device for securing each operating device to the actuating mechanism, a clutch-controlled power mechanism, a bank of keys, and means operated by each key for connecting the power mechanism to the actuating mechanism, substantially as described.

60. The combination with a type-carrier, of a support, a series of tumblers movable with respect to the support, operating connections between the support and the type-carrier, means for locking each tumbler to the support, an operating device for each tumbler, an actuating mechanism, a locking device for securing each operating device to the actuating mechanism, a power mechanism, a bank of keys, and means operated by each key for connecting the power mechanism to the actuating mechanism, substantially as described.

61. The combination with a type-carrier, of a support, a series of tumblers movable with respect to the support, operating connections between the support and the type-carrier, means for locking each tumbler to the support, an operating device for each tumbler, an actuating mechanism, a locking device for securing each operating device to the actuating mechanism, a power mechanism, a bank of keys, a clutch for throwing the power mechanism into operation and means operated by each key for throwing in the clutch, substantially as described.

62. The combination with a type-carrier, of a support, a series of tumblers movable with respect to the support, operating connections between the support and the type-carrier, means for locking each tumbler to the support, an operating device for each tumbler, an actuating mechanism, a locking device for securing each operating device to the actuating mechanism, a power mechanism, a bank of keys, means whereby each key operates a locking device to lock an operating device to the actuating mechanism, and means operated by each key for connecting the power mechanism to the actuating mechanism, substantially as described.

63. The combination with a type-carrier, of a support, a series of tumblers movable with respect to the support, operating connections between the support and the type-carrier, means for locking each tumbler to the suptween the type-carrier and each support, an operating device for each support including a tumbler, a locking mechanism for each support, an independent releasing mechanism for each locking device, and a releasing mechanism common to the locking devices of both supports, substantially as described.

72. The combination with a type-carrier, of a pair of supports, operating connections between the type-carrier and each support, a series of key-levers a part of which coöperate with one of the supports and the remainder of which coöperate with the other support, means including a tumbler thrown into operation by the key-levers for operating the supports, a locking device for each support, an independent releasing device for the locking device of each support operated by the key-levers for that support, a releasing device common to the locking devices of both supports which is thrown into operation after a predetermined amount of movement of one of the supports, substantially as described.

73. The combination with a type-carrier, of a pair of supports, operating connections between each support and the type-carrier, a series of key-levers a part of which operate in connection with one of the supports and a part of which operate in connection with the other support, means thrown into operation by each key-lever for operating the supports, a locking-arm extending from each support, a finger coöperating with each locking-arm, means whereby one of the fingers is operated by a part of the key-levers, means whereby the other finger is operated by the remainder of the key-levers, and a common operating device for both fingers, substantially as described.

74. The combination with a pair of supports, of a type-carrier, operating connections between each support and the type-carrier, a series of key-levers, a part of which operate in connection with one of the supports and the remainder in connection with the other support, means thrown into operation by the key-levers for operating the support, a locking-arm connected with each support, a shaft, a finger coöperating with each locking-arm, said fingers being mounted on and movable with respect to the shaft and each finger having an extension, means connected with each extension for operating the shaft, means whereby part of the key-levers operate one of the extensions, and means whereby the remainder of the key-levers operate the other extension, a power mechanism, means controlled by the shaft for throwing the power mechanism into operation, and a releasing device operating on both extensions, substantially as described.

75. The combination with a type-carrier, of a two-part operating mechanism including a plurality of tumblers, connections between each part of the operating mechanism and the type-carrier, an independent locking device for each part of the two-part operating mechanism, an independent releasing device for each locking device, and a common releasing device for both locking devices, substantially as described.

76. The combination with a type-carrier, of a two-part operating mechanism including a plurality of tumblers, connections between each part of the operating mechanism and the type-carrier, an independent locking device for each part of the two-part operating mechanism, an independent releasing device for each locking device, and a common releasing device for both locking devices operated from the operating mechanism, substantially as described.

77. The combination with a type-carrier, of a plurality of sets of tumblers, connections between each set of tumblers and the type-carrier whereby each tumbler operates the carrier, a plurality of locking devices, one for each set of connections, a releasing device for each locking device, and a releasing device common to all the locking devices, substantially as described.

78. The combination with a type-carrier, of a plurality of sets of tumblers, connections between each set of tumblers, and the type-carrier whereby each tumbler operates the carrier, a plurality of locking devices one for each set of connections, a releasing device for each locking device, a releasing device common to all the locking devices, and means whereby said device is operated from the tumblers, substantially as described.

79. The combination with a type-carrier, of a plurality of sets of graduated tumblers, connections between each set of tumblers and the type-carrier whereby each tumbler operates the carrier, a plurality of locking devices one for each set of connections, a releasing device for each locking device, a releasing device common to all the locking devices, and means whereby said device is operated from the tumblers, substantially as described.

80. The combination with a type-carrier, of a plurality of sets of graduated tumblers, connections between each set of tumblers and the type-carrier whereby the tumblers operate the type-carrier, a set of key-levers, means controlled by the key-levers for operating the tumblers, a locking device for each set of connections, an independent releasing device for each locking device, a releasing device common to all the locking devices, means whereby each tumbler operates the common releasing device, and means whereby a movement of a key-lever throws one of the tumblers into operation and simultaneously releases the locking devices for the connections of that tumbler, substantially as described.

81. The combination with a type-carrier, of a pair of supports having projections, operating connections between the supports and the type-carrier, a series of notched graduated tumblers carried on each support and movable with respect thereto, a locking device for each support, an independent releasport, an operating device for each tumbler, an actuating mechanism, a locking device for securing each operating device to the actuating mechanism, a power mechanism, a bank of keys, means whereby each key operates a locking device to lock an operating device to the actuating mechanism, connections including a clutch between the power mechanism and the actuating mechanism, and means whereby each key operates the clutch, substantially as described.

64. The combination with a type-carrier, of a pair of supports, operating connections between the type-carrier and each of the supports, a series of tumblers carried by each support, means for locking each tumbler to its support, a locking device for each support which prevents any movement of that support, an operating device for each tumbler, means for operating said devices, means for releasing the locking device for the support by which an actuated tumbler is carried, and means for releasing the locking device for the second support after a predetermined amount of movement of the first support, substantially as described.

65. The combination with a type-carrier, of a pair of supports, operating connections between the type-carrier and each of the supports, a series of tumblers carried by each support, means for locking each tumbler to its support, a locking device for each support which prevents any movement of that support, an operating device for each tumbler, means for operating said devices, means for releasing the locking device for the support by which an actuated tumbler is carried, and means thrown into operation by the moving tumbler for releasing the locking devices for the second support after a predetermined amount of movement of the first support, substantially as described.

66. The combination with a type-carrier, of a pair of supports, operating connections between the type-carrier and each of the supports, a series of tumblers carried by each support and movable with respect to the supports, means brought into operation by the movement of each tumbler with respect to its support for locking the tumbler to the support, an operating device for each tumbler which first moves the tumbler with respect to the support whereby it is locked to the support and then moves the tumbler and the support, means for releasing the locking device of the support by which an actuated tumbler is carried, means for releasing the locking device of the second support after a predetermined amount of movement of the first support, substantially as described.

67. The combination with a type-carrier, of a pair of supports, operating connections between the type-carrier and each of the supports, a series of tumblers carried by each support and movable with respect to the supports, means brought into operation by the movement of each tumbler with respect to its support for locking the tumbler to the support, an operating device for each tumbler which first moves the tumbler with respect to the support whereby it is locked to the support and then moves the tumbler and the support, means for releasing the locking device of the support by which an actuated tumbler is carried, means thrown into operation by the moving tumbler for releasing the locking device of the second support after a predetermined amount of movement of the first support, substantially as described.

68. The combination with a type-carrier, of a pair of supports, operating connections between the type-carrier and each of the supports, a series of tumblers carried by each support, means for locking each tumbler to its support, a locking device for each support which prevents any movement of that support, an operating device for each tumbler, operating means therefor, an independent releasing device for the locking device of each support, a releasing device common to the locking devices of both supports, means for releasing the independent locking device of one support when one of its tumblers is actuated, and means for actuating the common releasing device after a predetermined amount of movement of the moving support and tumbler, substantially as described.

69. The combination with a type-carrier, of a pair of supports, operating connections between the type-carrier and each of the supports, a series of tumblers carried by each support, said tumblers being movable with respect to the support, means brought into operation by the movement of the tumblers with respect to their supports for locking the tumblers to the supports, a locking device for each support which prevents any movement of that support, an actuating device for each tumbler, means for operating each actuating device, an independent releasing device for the locking device of each support, a releasing device common to the locking devices of both supports, means for releasing the independent locking device of one support when one of its tumblers is actuated, and means for actuating the common releasing device after a predetermined amount of movement of the moving support and tumbler, substantially as described.

70. The combination with a type-carrier, of a pair of supports, operating connections between each support and the type-carrier, a series of tumblers having graduated operating ends carried on each support, a locking device for each support, an independent releasing device for each locking device, a releasing device common to the locking devices of both supports, said releasing devices including a bar or bail which is operated by the graduated ends of the tumblers, and means for actuating the tumblers, substantially as described.

71. The combination with a type-carrier, of a pair of supports, operating connections beshaft and arranged to engage the carriage, a key-lever, and connections from the shaft to the key-lever, whereby one friction-wheel is caused to engage the power mechanism and the other the carriage, substantially as described.

94. In a power-driven type-writing machine, the combination with the power mechanism and the carriage, of a bodily-movable shaft, a friction driving-wheel mounted on the shaft and arranged to be driven from the power mechanism, a friction driving-wheel mounted on the shaft and arranged to engage the carriage, and means whereby the shaft is moved to cause the engagement of both friction-wheels, substantially as described.

95. In a power-driven type-writing machine, the combination with the power mechanism and the carriage, of a bodily-movable shaft, a friction driving-wheel mounted on the shaft and arranged to be driven from the power mechanism, a friction driving-wheel mounted on the shaft and arranged to engage the carriage, a key-lever, and connections between the key-lever and the shaft, whereby the shaft is moved to cause the engagement of both friction-wheels, substantially as described.

96. In a power-driven type-writing machine, the combination with a power mechanism and the carriage, of a spring-supported shaft, a friction driving-wheel mounted on the shaft and arranged to be driven from the power mechanism, a friction driving-wheel also mounted on the shaft and arranged to engage the carriage, and means for moving the shaft against the stress of the spring for causing the engagement of both wheels, substantially as described.

97. In a power-driven type-writing machine, the combination with a power mechanism and the carriage, of a spring-supported shaft, a friction driving-wheel mounted on the shaft and arranged to be driven from the power mechanism, a friction driving-wheel also mounted on the shaft and arranged to engage the carriage, a key-lever, and connections between the key-lever and the shaft, whereby the shaft is moved against the stress of the spring for causing the engagement of both friction-wheels, substantially as described.

98. In a power-driven type-writing machine, the combination with a power mechanism and the carriage, of a spring-supported shaft, a block forming a bearing for the shaft, diagonal ways in which the block moves, a friction driving-wheel mounted on the shaft and arranged to be driven from the power mechanism, a friction driving-wheel also mounted on the shaft and arranged to engage the carriage, and means for moving the block in its ways and thus causing the engagement of the friction-wheels, substantially as described.

99. In a power-driven type-writing machine, the combination with a power mechanism and the carriage, of a spring-supported shaft, a block forming a bearing for the shaft, diagonal ways in which the block moves, a friction driving-wheel mounted on the shaft and arranged to be driven from the power mechanism, a friction driving-wheel also mounted on the shaft and arranged to engage the carriage, a key-lever, and connections between the block and the key-lever whereby the block is moved in the ways, thus causing the engagement of the friction-wheels, substantially as described.

100. The combination with a constantly-running power-shaft, of a crank driving-wheel loosely mounted thereon, a clutch mechanism between the driving-wheel and the shaft, means whereby the clutch mechanism is normally held inoperative, a pivoted actuating-bar, a series of operating-levers, a series of bell-crank locking-levers for connecting the actuating-bar and the operating-levers, a pair of supports, a series of graduated tumblers mounted on each support, means whereby each tumbler may be locked to its support, a locking device for each support, an independent releasing device for each locking device, a common releasing device for both locking devices, a type-wheel, operating connections between the supports and the type-wheel, a stopping-ratchet connected to the type-wheel, a stop-pawl, a bail on which the pawl is carried, connections from the bail to the common releasing device, a series of key-levers, and connections whereby each key-lever operates one of the independent releasing devices, a bell-crank locking-lever and throws in the clutch mechanism, substantially as described.

101. The combination with a constantly-running power-shaft, of a driving crank-wheel loosely mounted thereon, a clutch mechanism between the driving crank-wheel and the power-shaft, means whereby the clutch mechanism is normally held inoperative, a vibrating actuating-bar, connections between the actuating-bar and the driving-wheel, a pair of supports, a series of graduated tumblers carried on each support, operating-levers for the tumblers, locking devices connecting said operating-levers to the actuating-bar, a locking device for each support, an independent releasing device for each locking device, a releasing device common to both locking devices, a series of key-levers, a shaft, an arm on the shaft, operating connections between said arm and the clutch mechanism, means whereby each key-lever operates an independent releasing device, rocks the shaft, operates the clutch and operates a locking device to connect an operating-lever to the actuating-bar, and means controlled by the graduations on the tumblers for operating the common releasing device, substantially as described.

102. The combination with a constantly-running power mechanism, of a driving-wheel, a clutch between the driving-wheel and the ing device for each locking device, a common releasing device for both supports including a bar which is actuated by the graduated tumblers, a series of key-levers, a power mechanism, means whereby the power mechanism operates the tumblers, the connections being such that a tumbler is first moved until it engages the projection on the support and then the tumbler and support are moved together, and means whereby each key-lever operates the independent releasing device for a support when a tumbler of that support is actuated, substantially as described.

82. The combination with a type-carrier, of a two-part operating mechanism therefor, connections between each part of the operating mechanism and the type-carrier, a locking device for each part of the operating mechanism, a power mechanism, connections between the power mechanism and the two-part operating mechanism, a set of key-levers, and means whereby each key-lever operates one of the releasing devices and throws the power mechanism into operation, substantially as described.

83. The combination with a type-carrier, of a two-part operating mechanism therefor, a shaft, an independent locking device for each part of the operating mechanism, said locking devices being mounted on the shaft and movable with respect thereto, a series of key-levers, a power mechanism, connections between the power mechanism and the two-part operating mechanism, and means whereby a movement of one of the key-levers operates one of the releasing devices and turns the shaft to throw the power mechanism into operation, substantially as described.

84. The combination with a type-carrier, of a two-part operating mechanism therefor, a shaft, a locking-finger for each part of the two-part operating mechanism carried on the shaft, said fingers being movable with respect to the shaft, a projection on the shaft, a series of key-levers, part of which coöperate with one part of the two-part operating mechanism and the remainder with the other part, extensions connected with the fingers and in position to be struck by the key-levers, an arm on the shaft, connections operated by the arm for throwing the power mechanism into operation, and a common releasing device for the two fingers operated from the two-part operating mechanism, substantially as described.

85. The combination with a constantly-running power mechanism of a type mechanism, means for intermittently connecting the actuating mechanism to the type mechanism, a bank of keys, and means controlled by each of the keys for causing the power mechanism to operate the actuating mechanism, said means including a yielding connection, substantially as described.

86. The combination with a type mechanism comprising a series of separate characters of an actuating mechanism, a bank of keys, connections controlled by the keys between the type mechanism and the actuating mechanism whereby the actuating mechanism operates each of the characters, a power mechanism, a yielding connection between the power mechanism and the actuating mechanism and a spring for controlling said connections, substantially as described.

87. The combination with a constantly-running power-shaft of a type mechanism comprising a series of separate characters, an actuating-bar, a bank of keys, key-controlled connections between the actuating-bar and the type mechanism whereby the bar operates each character, a driving-wheel, and means whereby the driving-wheel produces a lateral movement of the bar, said means including a spring-controlled yielding connection, substantially as described.

88. The combination with a type mechanism, of an actuating-bar, operating connections between the actuating-bar and the type mechanism, a driving-wheel, a bank of keys, a clutch for connecting the driving-wheel to the shaft, means controlled by each of the keys for operating the clutch, a slotted rod connecting the driving-wheel to the actuating-bar, and a spring bearing against the end of the rod, substantially as described.

89. In a power-driven type-writing machine, the combination with the power mechanism and the carriage, of a key-lever, and connections between the carriage and power mechanism controlled by the key-lever whereby the carriage is returned by the power mechanism, substantially as described.

90. In a power-driven type-writing machine, the combination with the power mechanism and the carriage, of a friction mechanism interposed between the power mechanism and the carriage, a key-lever, and connections between the friction mechanism and the key-lever, substantially as described.

91. In a power-driven type-writing machine, the combination with the power mechanism and the carriage, of a shaft, driving devices intermediate the shaft and the power mechanism, driving devices intermediate the shaft and the carriage, a key-lever, and connections between the key-lever and the shaft for causing the engagement of the driving devices, substantially as described.

92. In a power-driven type-writing machine, the combination with the power mechanism and the carriage, of a shaft, means whereby the shaft is driven from the power mechanism, a friction driving device mounted on the shaft, a key-lever, and connections between the shaft and the key-lever whereby the friction driving device is caused to engage the carriage, substantially as described.

93. In a power-driven type-writing machine, the combination with the power mechanism and the carriage, of a shaft, a friction driving-wheel mounted on the shaft and arranged to be driven from the power mechanism, a friction driving-wheel mounted on the power mechanism, an actuating mechanism, separable connections between the actuating mechanism and the driving-wheel, a type mechanism, connections between the actuating mechanism and the type mechanism, a series of key-levers, and means whereby each of the key-levers operates the clutch, the key-levers being arranged when the connections between the driving-wheel and the actuating mechanism are disconnected to operate the type mechanism through the connections between it and the actuating mechanism, substantially as described.

103. The combination with a constantly-running power-shaft, of a driving-wheel loosely mounted thereon, a clutch for connecting the wheel to and disconnecting it from the shaft, an arm, connections between the arm and the power-shaft, an actuating-bar, a set-screw connecting the actuating-bar and the arm, a type mechanism, connections between the type mechanism and the actuating-bar, a series of key-levers, means whereby each key-lever operates the clutch when the arm and bar are connected by the set-screw, and means whereby each key-lever operates the type mechanism through the connections between it and the actuating-bar when the bar and arm are disconnected, substantially as described.

104. The combination with a constantly-running power mechanism, of a driving mechanism, a clutch between the driving mechanism and the power mechanism, an actuating mechanism, separable connections between the driving mechanism and the actuating mechanism, a type mechanism locking devices between the type mechanism and the actuating mechanism, a series of key-levers, and means whereby each key-lever operates the clutch and the locking devices to throw the actuating mechanism into operation and cause it to operate the type mechanism, the key-levers being arranged to operate the type mechanism through the locking devices when the connections between the driving mechanism and the actuating mechanism are uninterrupted, substantially as described.

105. The combination with a constantly-running power-shaft, of a driving-wheel, a clutch between the driving-wheel and the power-shaft, an arm, connections between the arm and the driving-wheel, a pivoted actuating-bar, means for separably connecting the arm and the actuating-bar, a series of operating-levers, a series of locking devices connecting the operating-levers and the actuating-bar, a type mechanism, connections between the operating-levers and the type mechanism, a series of key-levers, and means whereby each key-lever operates the clutch and a locking device to throw the actuating-bar into operation and cause the operation of the type mechanism, the levers being arranged when the connections between the driving-wheel and the actuating-bar are uninterrupted to operate the locking devices and through the locking devices effect the operation of the type mechanism, substantially as described.

106. In a type-writing machine the combination with a type mechanism of a power mechanism, a series of key-levers, devices for causing the power mechanism to operate the type mechanism and means whereby the key-levers operate the type mechanism when it is not operated by the power mechanism, substantially as described.

107. The combination with a type mechanism, of a power mechanism, a series of key-levers, devices controlled by the key-levers for causing the power mechanism to operate the type mechanism, means whereby the key-levers operate the type mechanism when it is not operated from the power mechanism, a stop operating to limit the movement of the key-levers when the power mechanism is operated, the stop being arranged to be moved out of the way when the power mechanism is inoperative and the key-levers are operating the type mechanism, substantially as described.

108. The combination with a type mechanism, of a power mechanism, a series of key-levers, devices controlled by the key-levers for causing the power mechanism to operate the type mechanism, means whereby the key-levers operate the type mechanism when it is not operated from the power mechanism, a pivoted stop operating to limit the movement of the key-levers when the power mechanism is operated, said stop being arranged to be moved out of the way when the power mechanism is inoperative and the key-levers are operating the type mechanism, substantially as described.

109. In a type-writing machine, the combination with a type mechanism of a power mechanism, a series of key-levers, a stop for limiting the movement of the key-levers, means for rendering the stop inoperative, and connections whereby the key-levers throw the power mechanism into operation to actuate the type mechanism when the stop is in operative position and operate the type mechanism when the stop is in inoperative position, substantially as described.

110. In a type-writing machine, the combination with a type mechanism of a series of key-levers, a pivoted stop located beneath the levers and at a distance therefrom, the construction being such that the levers may be given a limited downward movement when the stop is turned on its pivot into operative position, and a spring for holding the stop in said position, substantially as described.

111. The combination with a type mechanism, of a power mechanism, a series of key-levers, devices controlled by the key-levers for causing the power mechanism to operate the type mechanism, means whereby the key-levers operate the type mechanism when it is not operated from the power mechanism, a pivoted stop operating to limit the movement of the key-levers when the power mechanism is operated, and a spring for holding the stop in position, said stop being arranged to be moved out of the way when the power mechanism is inoperative and the key-levers are operating the type mechanism, substantially as described.

In testimony whereof I have hereunto set my hand in the presence of two subscribing witnesses.

GEORGE C. BLICKENSDERFER.

Witnesses:
JOHN A. GRAVES,
A. A. V. BOURKE.